UNITED STATES PATENT OFFICE.

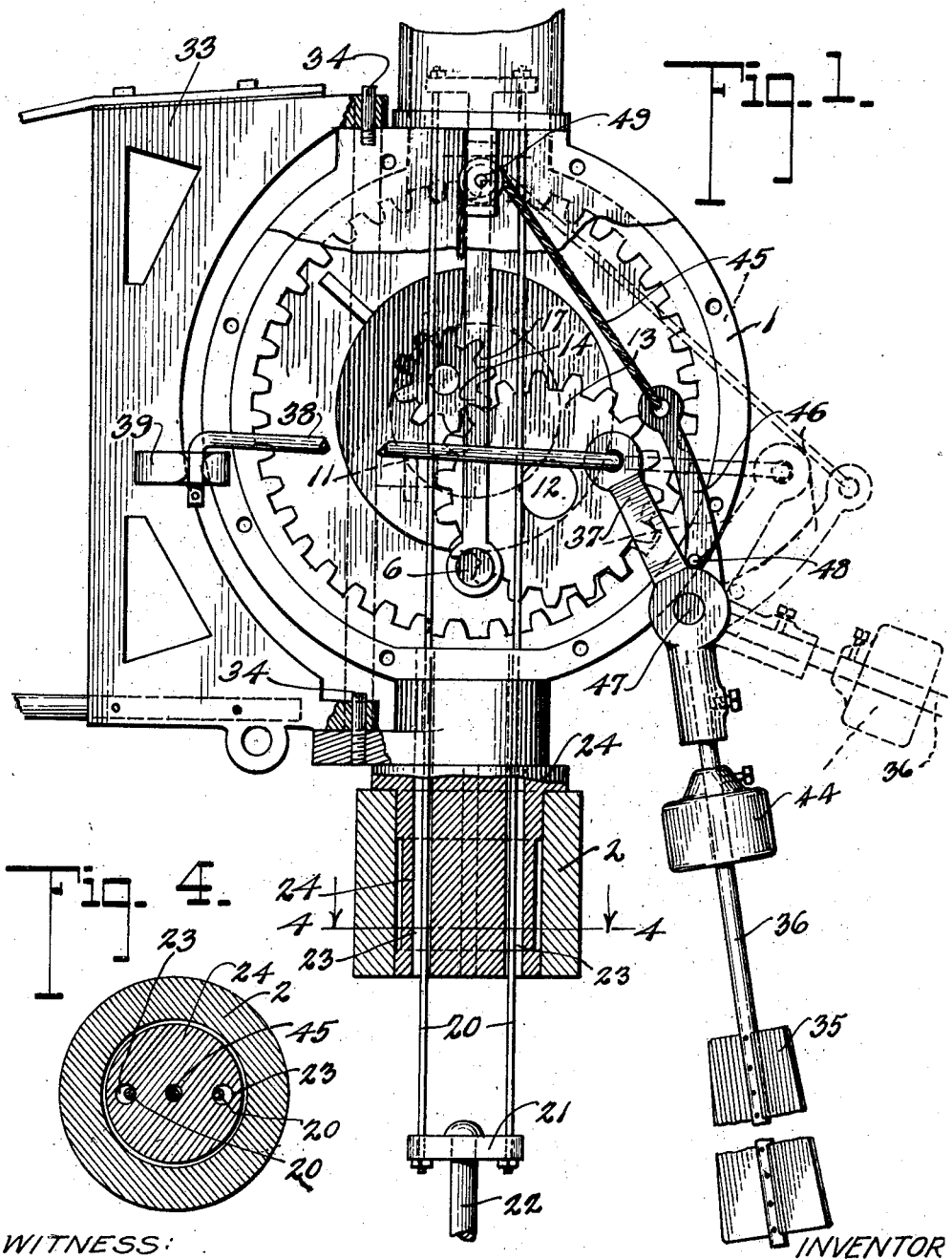

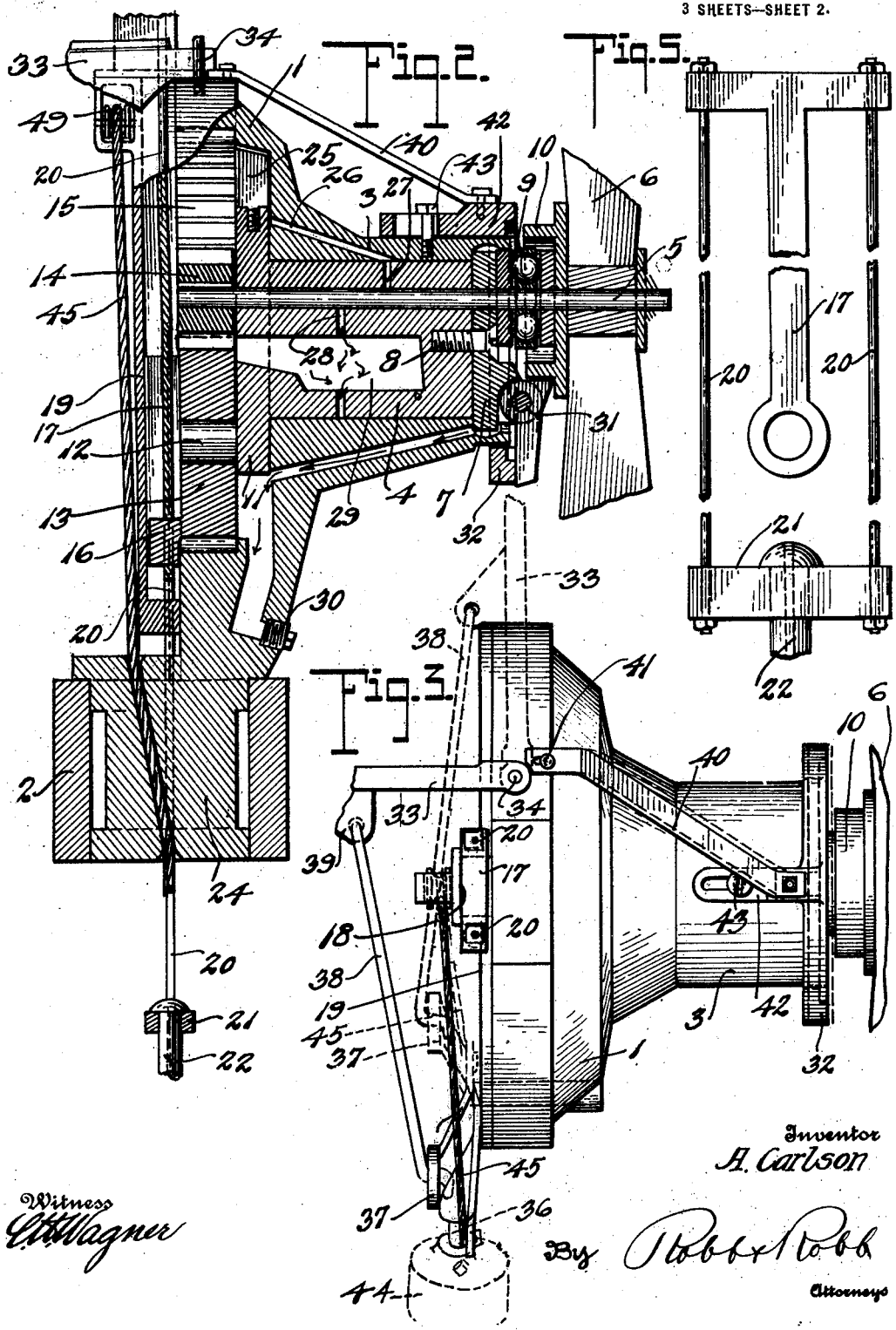

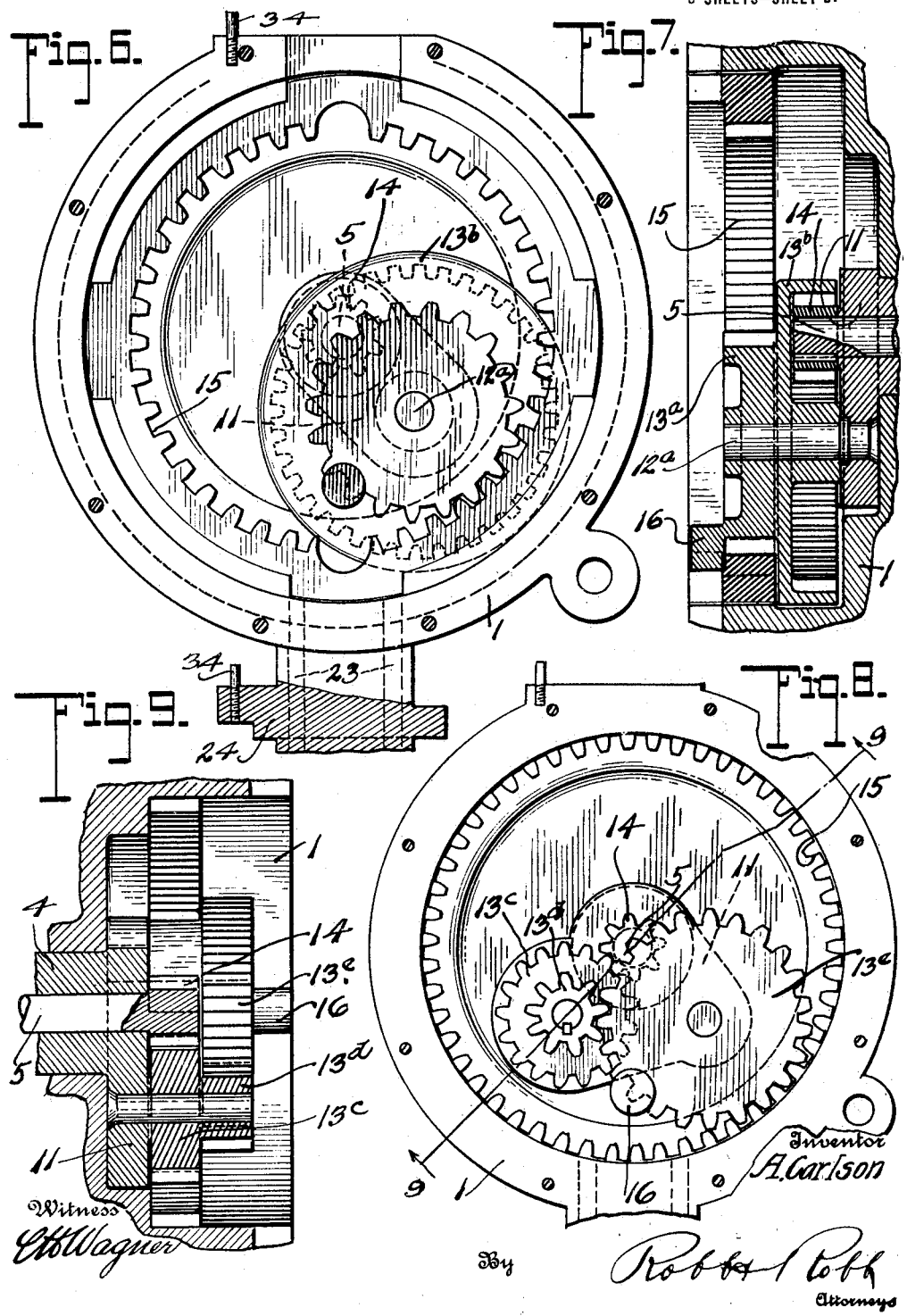

ALFRED CARLSON, OF KLAMATH FALLS, OREGON.

WINDMILL-GEAR AND CONTROL MECHANISM.

1,369,396.　　　　　Specification of Letters Patent.　　Patented Feb. 22, 1921.

Application filed November 19, 1919. Serial No. 339,166.

*To all whom it may concern:*

Be it known that I, ALFRED CARLSON, a citizen of the United States, residing at Klamath Falls, in the county of Klamath and State of Oregon, have invented certain new and useful Improvements in Windmill-Gear and Control Mechanism, of which the following is a specification.

This invention relates to improvements in windmills or windmill mechanism. The primary object is to provide a novel gearing arrangement of the planetary type, by means of which the rotary motion of the wind wheel is converted into straight line motion, the novel feature of the invention residing more particularly in the counterbalance arrangement of the wheel and reciprocating parts.

A further object in view is to provide a novel governor control especially adapted to take care of the counterbalancing gear arrangement aforesaid and to also improve the general features of construction of mechanism of this character.

These and such other objects as may hereinafter appear are attained by the novel construction, combination and arrangement of parts to be hereinafter specifically described and claimed. Reference will now be had to the accompanying drawings forming a part of this specification, wherein:

Figure 1 is a front elevation partly broken away and shown in section of a construction involving my invention.

Fig. 2 is a fragmentary sectional view taken at right angles to the view shown in Fig. 1.

Fig. 3 is a top plan.

Fig. 4 is a sectional view on the line 4—4 of Fig. 1.

Fig. 5 is a detail view of the pitman connection for the pump rod.

Fig. 6 is a modified form of gearing for increasing the power.

Fig. 7 is a vertical sectional view of the gearing arrangement of Fig. 6.

Fig. 8 is an elevation view of a further modified form of gearing, and

Fig. 9 is a sectional view on the line 9—9 of Fig. 8.

Throughout the following detail description and on the several figures of the drawings, similar parts are referred to by like reference characters.

Gearing.

Referring to the Figs. 1 and 2, the windmill head of my invention comprises the casing or housing 1 which rests upon the usual turntable support 2 and is formed at one side with the hub or bearing extension 3. Within this extension is revolubly mounted a bushing or bearing 4 in which the driving shaft 5 is journaled, said shaft carrying at its outer end the wind wheel 6. The bushing 4 is held in place by the retainer plate 7 secured by the fastening means 8 to the end of said bushing and engaging with the hub of the housing at the periphery. Between this plate and the wheel are interposed suitable ball bearings 9 directly adjacent to which is the brake drum 10 attached to the wheel.

Within the casing 1 the bushing 4 is formed with a flange or arm 11 from which projects a crank pin 12 carrying the planetary gear 13 in mesh with the driving pinion 14 fixed to the driving shaft 5, the gear 13, furthermore, being in mesh with the annular gear path or rack 15 formed on the casing. The gear 13 is provided with the crank pin 16 connecting with a T-shaped pitman connection 17, most clearly shown in Fig. 5, said pitman being guided in its reciprocatory movements by the offset groove 18 of the cover 19 closing the housing 1. (See Fig. 3.). A pair of rods 20 extend from the pitman 17 to the swivel connection 21 at the top of the pump rod 22, these rods extending downwardly through suitable passages 23 in the head bearing 24 and cover. By this arrangement it is unnecessary to employ a stuffing box to prevent leakage of oil from the casing and thus eliminating not a little friction. Before leaving the gearing mechanism, the important feature to note is the fact that the drive shaft 5 is mounted eccentrically in the bushing 4. Thus in the operation of the gearing the pinion 14 planetates about the spur gear 13 as this latter gear moves in its planetary path in turn about the pinion. The result of this arrangement is that the weight of the wheel and its shaft assists in the lifting action, these parts going down as the pump rod and water are lifted. A self-balancing mechanism is thereby produced which is of great advantage in a device of this character.

The oiling system.

The mechanism within the casing 1 operates in a bath of oil, a carrier blade 25 being attached to the flange 11 of the bushing 4 to raise the oil to the highest point in the casing for distribution as the bushing rotates in operation.

Oil grooves 26, 27, 28 and the recess 29 in the bushing operate to further the circulation of the oil to the friction surfaces. A drain plug 30 permits the oil to be withdrawn when the cover is to be removed or when otherwise required.

The control mechanism.

Passing now to the governor or control mechanism employed in this construction, it will be obvious that owing to the eccentric arrangement of the driving shaft and wheel special provision must be made to obtain a brake application. To this end I mount upon the retainer 7 a pivoted brake member 31 adapted to contact at one end with the brake drum 10 of the wheel 6 and operable by means of an annular or ring actuator 32 surrounding the end of the hub extension 3 which is arranged to contact with the other end of the brake member when shifted toward the wheel by means now to be set forth.

I employ the usual ruddervane for this mechanism whereby the wheel is held in the wind, the inner end of the supporting frame for which is shown in Fig. 1 and designated 33, pivotally connected to the casing or head by the studs 34. The rudder is controlled by a small governor vane 35 set at such an angle as to be operable when the wind pressure becomes excessive, causing the arm 36 on which it is carried to rise and through the arm 37 and the push rod 38 connected to the lug 39 on the frame 33 to push the rudder into the full line position shown in Fig. 1, or the dotted line position shown in Fig. 3, which brings the wheel to out of the wind position.

In the last mentioned figure, it will be observed that as the rudder swings around into the out of the wind position, the inner end at the top of the windmill head contacts with the end of a bar 40 which is secured and guided by the stud 41 on the casing 1 and connected to the ring or brake actuator 32, the latter being provided with a lateral extension 42 which is suitably slotted to engage with the fastening means 43 on the hub extension 3. Thus the brake member, on outward movement of the ring 32, is applied to the brake drum simultaneously with the shifting of the wheel into inoperative position. The arm 36 is provided with a counterbalancing weight 44 to assist in the return of the governor vane to its lowermost position and the wheel into position facing in the wind. This weight is adjustable on the arm in the usual manner.

It is customary to provide mechanisms of this character with manual means for rendering them inoperative and for this purpose I employ a pull out rope or cable 45 which is connected to the arm 46 mounted upon the axis 47 for the arm 36, the arm 46 having a projection 48 arranged to impinge the arm 37 when shifted by the rope 45 to enable the arm 36 to be raised and the rudder to be turned into inoperative position. The rope 45 passes over a sheath 49 on the cover 19 then downwardly through a central passage in the bearing member 24 to a point convenient of access for the purposes designated.

Gear modifications.

Referring to Figs. 6 to 8, inclusive, I have there illustrated different forms of reduction gearing, by means of which to obtain an increase in the power of the mechanism. In Figs. 6 and 7 the arm 10 of the bushing 4 carries the crank-pin 12$^a$ on which is mounted a compound gear consisting of the spur gear 13$^a$ at one side which meshes with the casing rack 15, and the internally toothed relatively larger gear 13$^b$ at its opposite side. The latter gear element is in mesh with the driving pinion 14 on the driving shaft 5. The planetary gear element 13$^a$ is provided with the pitman connection 16 as in the preferred form.

In Figs. 8 and 9 a further reduction of the gearing is obtained by mounting upon the bushing arm 11, which is suitably enlarged for the purpose, the spur gear 13$^c$ having at one side the relatively fixed pinion 13$^d$ which meshes with the planetary gear 13$^e$, the latter in turn being in mesh with the gear path 15 on the casing 1. The drive shaft pinion 14 in this instance meshes with the spur gear 13$^c$ while the planetary gear 13$^e$ carries the pitman connection 16 as usual.

Having thus described my invention, what I claim as new is:

1. In pumping mechanism of the class described, the combination of a driving shaft, a bearing member is which said shaft is eccentrically mounted, means intermediate the shaft and the bearing member to communicate motion from the former to the latter, and a pump element operable by said bearing.

2. In pump mechanism of the class described, the combination of a driving shaft, a bearing member in which said shaft is eccentrically mounted, a planetary gear carried by said bearing member and driven by said shaft whereby as the gear planetates about the shaft the latter in turn planetates about the said gear, and a pump element actuated by said gear.

3. In pump mechanism of the class described, the combination of a support, a driving shaft, a bearing on said support in which the shaft is eccentrically mounted and having a crank connection thereon, a planetary gear carried by said crank connection, a driving pinion on said shaft engaging said planetary gear, and a gear path on said support for said planetary gear.

4. Windmill pumping mechanism of the class described, including a head support, a driving shaft, a movably mounted bearing within which the driving shaft is journaled, and transmission gearing operatively connected to the driving shaft and arranged to move the bearing to raise and lower the shaft as it is rotated.

5. In pumping mechanism of the class described, the combination of a housing, a driving shaft, a wind wheel on said shaft, a bearing in which said shaft is eccentrically mounted and having a crank arm, a driving pinion fixed to said shaft, a planetary gear carried by said crank arm, an internal gear path in the housing for said planetary gear, and a pump rod connected to the planetary gear whereby the weight of the wind wheel will assist in lifting the pump rod as the planetary gear planetates about the shaft and the latter planetates about the driving pinion.

6. In pumping mechanism of the class described, the combination of a housing, a driving shaft, a wind wheel on said shaft, a bushing revolubly mounted in said housing and in which said shaft is eccentrically journaled, a crank connection on said bushing, a planetary gear on said connection movable in a path concentric with the driving shaft, a driving pinion on said shaft meshing with the planetary gear, a pitman connection on said planetary gear, a pitman connected to said connection, means on said housing with which the pitman coöperates to maintain movement of the same in a straight path, and a pump rod adapted to be reciprocated by the pitman aforesaid.

7. Windmill pumping mechanism of the class described, including a driving shaft upon which the wind wheel is mounted, and transmission gearing between the driving shaft and the pump, said transmission gearing including means for bodily raising and lowering the driving shaft and wheel whereby the weight thereof is utilized as a counter-balance for the pump.

8. Windmill pumping mechanism of the class described including a rotatably mounted bearing, a driving shaft journaled eccentrically within the bearing and having the wind wheel applied thereto, and transmission gearing between the drive shaft and the pump, said transmission gearing including planetary elements which revolve the bearing to raise and lower the shaft and wind wheel whereby the weight of the latter is utilized as a counterweight for the pump.

9. In windmill pumping mechanism of the class described, the combination of a support, a driving shaft carried thereby, a wind wheel on said shaft, means for imparting planetary movement to the shaft and wheel whereby they are bodily raised and lowered, and means for braking the movement of the wheel during the planetary movement of said wheel and its shaft.

10. In windmill pumping mechanism of the class described, the combination of a support, a driving shaft carried thereby, a wind wheel on said shaft, means in which said shaft is journaled for imparting planetary movement thereto during rotation of the wheel whereby it is bodily raised and lowered, and a brake element carried by said means and applicable to the wheel during the planetary movement of the shaft.

11. Windmill pumping mechanism of the class described, including a rotatably mounted bearing, a driving shaft arranged eccentrically within the bearing and having the wind wheel applied thereto, a brake drum carried by the driving shaft, transmission gearing between the driving shaft and the pump and including means for rotating the bearing to raise and lower the driving shaft and wind wheel, a slide movable in the direction of the axis of the drive shaft, and means actuated by the slide for engaging the brake drum.

12. In windmill pumping mechanism of the class described, the combination of a support, a driving shaft carried thereby, a wind wheel mounted on said shaft including a brake drum concentric with said shaft, a bearing member revolubly mounted on said support and in which the shaft is eccentrically mounted, means actuated by the shaft for rotating the bearing member, and a brake member on said bearing member operable during movement of the shaft and bearing member to apply brake pressure to the drum.

13. In windmill pumping mechanism of the class described, the combination of a support, a driving shaft carried thereby, a wind wheel mounted on said shaft including a brake drum concentric with said shaft, a bearing member revolubly mounted on said support and in which the shaft is eccentrically mounted, a brake member on said bearing member operable during movement of the shaft and bearing member to apply brake pressure to the drum, and means for actuating the brake member incident to movement of the wheel to inoperative position.

14. In windmill pumping mechanism of the class described, the combination of a revoluble head or support provided with a hub extension, a wind wheel, a driving shaft on which said wheel is mounted, a bearing member carried by the support and in which said shaft is eccentrically mounted, a brake drum on the wheel concentric with the shaft, a brake member carried by said bearing member in position to coöperate with the brake drum, transmission means on said support for imparting relative planetary movements to the shaft and bearing member, a brake actuator mounted upon said extension of the head, and a governor means arranged to actuate said brake actuator to effect brake application upon excessive wind pressure.

15. In windmill pumping mechanism of the class described, the combination of a head or support, a wind wheel carried thereby, a driving shaft for said wheel, a bearing member in which said shaft is mounted, power transmission elements on said support adapted to impart movement to said bearing member, said support comprising a hollow casing in which the power transmission elements are disposed and adapted to contain a lubricant, means carried by said bearing member and operable therewith to carry the lubricant in said casing to an elevated position, and distributing channels arranged in said casing and bearing member for distribution of the lubricant to the friction surfaces.

16. In windmill gear of the class described, the combination of a driving shaft, a bearing member in which said shaft is mounted and having a crank arm and crank pin carried by said arm, planetary gear elements loosely mounted on said crank pin and including an internal gear element at one side and an external gear element at the other side, a pump rod connection carried by said planetary gear member, and a driving pinion for actuating the planetary gear elements.

In testimony whereof I affix my signature.

ALFRED CARLSON.